A. J. Carleton, Impd Spoke Socket for Wheels.
Springfield, Mass.
101821
PATENTED APR 12 1870
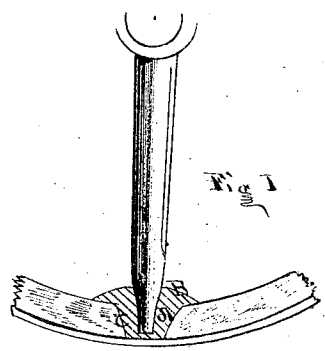
Fig. I
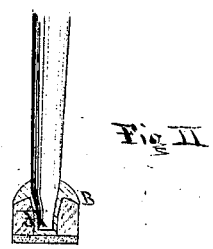
Fig. II
Fig. III
Fig. IV
Inventor,
A. J. Carleton.
by his attorneys
Gardiner & Hyde
Witnesses,
A. Moore
A. C. Wilson

United States Patent Office.

A. J. CARLETON, OF SPRINGFIELD, MASSACHUSETTS.

Letters Patent No. 101,821, dated April 12, 1870.

IMPROVEMENT IN SPOKE-SOCKET FOR CARRIAGE WHEELS.

The Schedule referred to in these Letters Patent and making part of the same.

To all to whom it may concern:

Be it known that I, A. J. CARLETON, of Springfield, Hampden county, State of Massachusetts, have invented a new and Improved Spoke-Socket; and I do hereby declare that the following is a full and clear description thereof, reference being had to the accompanying drawing, and to the letters of reference marked thereon.

In the drawings—

Figure I is a side view of my invention, shown in a sectional view of a wheel-felloe.

Figure II is a detail sectional view of the same.

Figure III is a plan view; and

Figure IV is an inverted plan view

My device consists simply of a cup of metal, A, having a flange, B, and flange C. The cup being sunk in the felloe of the wheel, and the flange B resting against the inner surface of the felloe, the bottom of the cup being in contact with the tire, and the flange C, in connection with flange B, holds the socket rigidly in place, preventing any lateral motion of the same in the felloe. The spoke rests in the cup, with its extreme end against the bottom. This prevents the spoke from driving into the felloe, and also from becoming loose and rattling.

There is no shoulder on the spoke at this end, it being merely fitted tightly into the cup.

By this means a neat, serviceable, and effective spoke-socket is obtained, and the wheel is made much more durable, and, from the fact of the spokes having firm metal sockets, the whole wheel may be made much lighter than any now in use without proportionate loss of strength or wear.

Now having described my invention,

What I claim as new, and desire to secure by Letters Patent, is—

The combination in a spoke-socket of the metallic cup A, with flanges B and C, the whole being so arranged with the spoke that it rests against the bottom of the cup A, as shown and described.

A. J. CARLETON.

Witnesses:
J. B. GARDINER,
M. P. HYDE.